United States Patent [19]

Akins

[11] Patent Number: 4,957,067
[45] Date of Patent: Sep. 18, 1990

[54] FEEDER FOR ANIMALS

[76] Inventor: Edward A. Akins, Box 158, Winnipeg, Manitoba, Canada, R2H 3B4

[21] Appl. No.: 375,262

[22] Filed: Jun. 3, 1989

[51] Int. Cl.$^5$ .......................... A01K 1/10; A01K 5/00
[52] U.S. Cl. .................................................. 119/60
[58] Field of Search ................. 119/60, 58, 53, 59, 119/61; D30/121, 133, 131, 128

[56] References Cited

U.S. PATENT DOCUMENTS

| | | | |
|---|---|---|---|
| Re. 29,291 | 7/1977 | Peak | 119/60 |
| D. 167,709 | 9/1952 | Muehlfeld . | |
| D. 236,273 | 8/1975 | Peak . | |
| D. 264,138 | 4/1982 | Harden . | |
| 387,892 | 8/1888 | Light . | |
| 1,319,060 | 10/1919 | Gardon | 119/53 |
| 2,122,591 | 7/1938 | Smrekar, Sr. | 119/60 |
| 2,491,577 | 12/1949 | Olinger | 119/60 |
| 2,515,698 | 7/1950 | Cosby | 119/53 |
| 2,533,984 | 12/1950 | Anson | 119/60 |
| 2,768,607 | 10/1956 | McClure, Jr. | 119/60 |
| 3,004,518 | 10/1961 | Struckhoff | 119/58 |
| 3,020,881 | 2/1962 | Strom | 119/58 |
| 3,102,511 | 9/1963 | Atcheson | 119/53 |
| 3,626,468 | 12/1971 | Hanson | 119/60 |
| 3,777,713 | 12/1973 | Deats | 119/60 |
| 3,834,353 | 9/1974 | Groezinger | 119/60 |
| 3,851,624 | 12/1974 | Peak | 119/60 |
| 3,881,449 | 5/1975 | Burrack et al. | 119/60 |
| 3,892,202 | 7/1975 | Feterl | 119/60 |
| 3,906,903 | 9/1975 | Vandewater | 119/60 |
| 4,067,298 | 1/1978 | Jones et al. | 119/60 |
| 4,148,278 | 4/1979 | Anderson | 119/60 |
| 4,193,378 | 3/1980 | Harden | 119/60 |
| 4,294,197 | 10/1981 | Snel et al. | 119/60 |
| 4,346,671 | 8/1982 | Wagner | 119/60 |
| 4,706,609 | 11/1987 | Delichte | 119/60 |

FOREIGN PATENT DOCUMENTS

| | | |
|---|---|---|
| 1010318 | 5/1977 | Canada . |
| 1013221 | 7/1977 | Canada . |
| 1219501 | 3/1987 | Canada . |
| 1243910 | 11/1988 | Canada . |
| 420485 | 4/1947 | Italy ........................ 119/58 |
| 6312 | of 1898 | United Kingdom ......... 119/58 |
| 1267914 | 3/1972 | United Kingdom ......... 119/60 |
| 1292185 | 10/1972 | United Kingdom . |

*Primary Examiner*—Paul J. Hirsch

[57] ABSTRACT

A feeder for cylindrical bales is of the tombstone type that is it includes a lower circular band defined by hoops and an upstanding sheet of material forming a skirt. U-shaped frames or tombstones are then attached to the outer frame and extend upwardly therefrom with the animal able to reach between the tombstones for grasping feed from a bale confined within the feeder. In accordance with the improvement of the present invention, the tombstones are bent inwardly and upwardly so that the animals front legs are confined outwardly away from the bale while the animal can reach over the inclined portion of the tombstone and through the vertical portion of the tombstone to the able. The animal is encouraged to feed within the outer frame and thus any waste is deposited within the outer frame and cannot be trampled or spoiled. The animal is inhibited from pressing its shoulders against the frame thus reducing damage or breakage and excessive movement of the feeder.

20 Claims, 2 Drawing Sheets

FEEDER FOR ANIMALS

BACKGROUND OF THE INVENTION

This invention relates to a feeder for receiving a large cylindrical bale for distributing the bale to a number of animals which are particularly but not exclusively cattle. Round bale feeders are well known and manufactured in large numbers. The feeders are designed to receive a single cylindrical bale of feed material which is confined within the bale feeder for access by a number of animals surrounding the bale feeder. The most simple feeders of this type comprise simply a plurality of circular rails which are connected to form a cylindrical body of a size to fit around the periphery of the bale. The connecting members comprise either vertical bars or slant bars so that the animal can pass its head through the bars to reach the feed from the bale which is confined within the feeder. Often a sheet metal skirt is provided from the lowermost ring which rests upon the ground to a height of the order of eighteen inches to assist in confining the feed material inside the feeder. Bale feeders of this type are manufactured in large numbers and by a large number of manufacturers. They do however a number of faults. Firstly there is a tendency for the animal particularly at the early stages of eating from a bale to pull material outwardly from the bale to the outside of the frame and to drop some of the material in that area outside of the frame wherein it becomes trampled and spoiled. Secondly the frame is prone to damage from being pushed around in the feed lot by the animals. The animal can press its shoulders against the bars and push forwardly in an attempt to reach feed within the frame and this pushing action often causes premature failure of the welded connections.

One type of feeder which is becoming more popular is that known as a "tombstone" feeder which is generally of the same construction as previously described except that the feeder is formed by a lower band reaching up approximately to the shoulders of the animal and a plurality of "tombstones" which project upwardly from the upper edge of the band. Each tombstone comprises a U-shaped frame member which is generally tubular in construction with the U-shape inverted to define a curved upper edge and the legs extending downwardly and connected to the band. This type of construction tends to be more rugged than the hoop type construction. In addition in between each tombstone and the next tombstone is a path or channel within which the animal can place its head with that path being open at the top so that the animal can lift its head out freely without contacting an upper rail or hoop of the feeder.

One example of a feeder of this general type is shown in British patent No. 1292185 which includes the outer band and tombstones but is of a modified construction in that it includes a hopper feeder arrangement centrally of the outer band. The tombstone feeder does however continue to have the problem of the waste material since the animal can pull the material outwardly from the bale to the outside of the feeder where it is trampled and wasted.

One improved arrangement is shown in U.S. Pat. No. 4,706,609 (Delichte) which shows an arrangement of the hoop type feeder in which an outer frame is provided having bars spaced sufficiently to allow the animal to pass its head between the bars into the area between the outer frame and an inner frame with the inner frame confining the bale away from the outer frame. In this way the animal reaches in through the outer frame to the bale confined inside of the inner frame and tends to eat with its head between the inner and outer frames so that any material falling from the mouth of the animal collects between the inner and outer frames and thus cannot be trampled. This feeder has therefore achieved some success since it resolves the problem of feed waste and significantly reduces waste to an amount which is economically viable despite the increased cost of the device due to the increased complexity.

This device does however have particular problems in that it is larger than conventional feeders and cannot be broken down into simple parts so that transportation of the large bulky feeder becomes very difficult and expensive. Conventionally feeders are often broken down into angularly separated parts which can be stacked readily one on top of the other allowing large numbers of feeders to be transported and subsequently bolted together to form the complete circular feeder. This transportation system is not possible in the improved feeder of Delichte leading to further increases in cost relative to conventional feeders As the cost of feed increases and improved cost efficiencies become necessary, more attention is being given to feed saving and hence improvements to the conventional feeder are becoming urgent. In addition the tombstone feeder is becoming more popular in view of its above stated advantages.

SUMMARY OF THE INVENTION

It is one object of the present invention to provide an improved design of feeder which may overcome or alleviate some or all of the above stated disadvantages.

According to a first aspect of the invention, therefore, there is provided a feeder for receiving a large cylindrical bale for distributing the bale to a number of animals, comprising an outer frame portion shaped to rest upon the ground and to define a band surrounding the bale and having an upper edge at which the outer frame terminates and a plurality of elongate frame members each connected to the outer frame and each having a first portion extending therefrom inwardly toward the bale and a second portion extending from the first portion upwardly to a height above the upper edge of the outer frame portion.

According to the second aspect of the invention, therefore, there is provided a feeder for receiving a large cylindrical bale for distributing the bale to a number of animals, comprising an outer frame portion which is substantially circular in plan and defines a band having a lower surface for resting upon the ground and for surrounding a bale resting upon the ground inwardly of the outer frame portion, the outer frame portion having an upper edge at which the outer frame portion terminates and a plurality of tombstone frame members each comprising an inverted U-shaped member defining a curved upper connecting portion and a pair of depending legs with each of the legs connected to the outer frame so as to extend upwardly from the upper edge of the outer frame to a height above the upper edge, each of the tombstone frame members having a first portion extending inwardly from the upper edge toward the bale and a second portion extending from the first portion substantially vertically upwardly to a height above the upper edge of the outer frame portion, the second portions of the tombstone frame members lying on a circle having a diameter less than the diameter of the outer frame portion so as to confine the bale inwardly of the outer frame portion and to define a space between the circle and the outer frame portion.

The construction provided therefore by the outer band of the device together with the inwardly turned frame members which extend upwardly from the outer band enables the device to be constructed simply and inexpensively and in addition can in some cases enable the device to be split angularly into separate parts for transportation.

When using the tombstone feeder construction, the tombstones provide a particularly rigid construction with open spaces between each tombstone and the next tombstone which enables the animal to reach through these open spaces and to pull their head from the open spaces by lifting through the free space at the top of the tombstones.

As the spacing between the tombstones at the second portion is narrower than the spacing at the outer band, the animal can reach between the frame members with more room to move its heads from side to side allowing it clean the area adjacent its feet.

The spacing between the second portions and the outer frame enable the animal to drop material so that it falls within the outer frame and remains in clean condition without being trampled.

As the outer frame is lower than the shoulders of the animal and the frame members are bent inwardly away from the outer frame, the animal has no possibility of applying large pressure forces against the outside of the frame. The shoulders of the animal can only just reach the second portions of the frame members while the animal retains its front feet on the ground so that it has great difficulty applying shoulder pressure against the frame members. This prevents the cattle from pushing the feeder around the feed lot and prevents the danger of damage by breaking of the welded couplings between the outer frame and the tombstone frame members.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles in the present invention, in which:

DESCRIPTION OF THE DRAWINGS

In the drawings like characters of reference indicate corresponding parts in the different figures.

DETAILED DESCRIPTION

The feeder comprises an outer frame portion generally indicated at 10 and a plurality of tombstone frame members 11.

Figure 1:
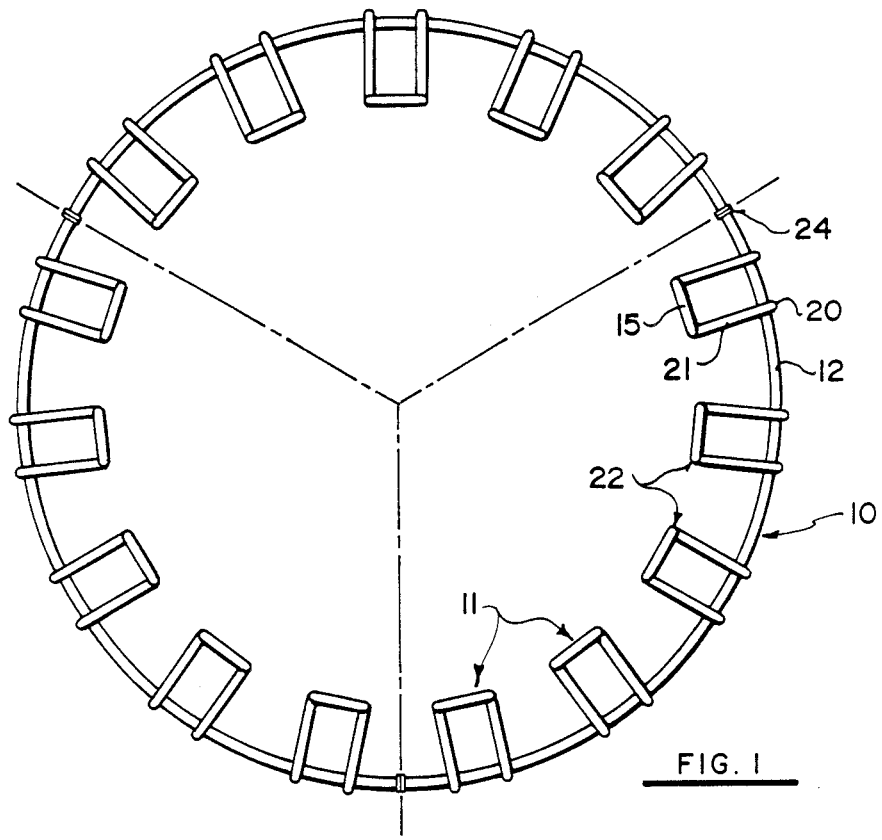
FIG. 1 is a top plan view of a feeder according to the invention.

The outer frame 10 comprises three circular hoops 12, 13 and 14 which surround substantially the whole of the feeder and define a circular shape for the outer frame portion in plan as shown in FIG. 1.

Each of the tombstone frame members comprises a metal tube bent to form an inverted U-shaped member with a curved upper portion 15 and a pair of depending legs 16 and 17. The depending legs 16 and 17 are welded to the outer frame portion 10 and thus support the hoops 12, 13 and 14 at spaced positions.

Figure 3:
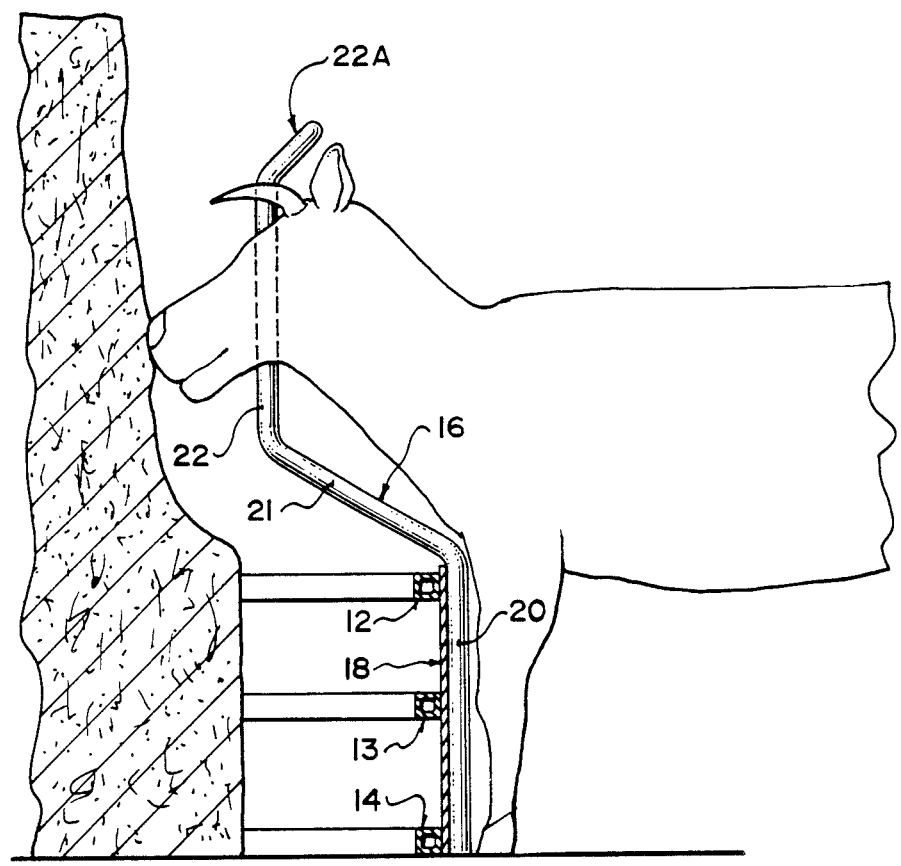
FIG. 3 is a cross sectional view through one side of the feeder showing the position of a bale and showing one slight modification relative to the device as shown in FIG. 1.

As shown in FIG. 3, the hoops 12, 13 and 14 are formed from tubular members. In addition there is provided an optional sheet metal skirt 18 welded to the tubular members. The skirt assists in preventing the escape of feed material from the area inside of the outer frame portion.

The "tombstone" members are so called in view of the fact that in elevational view they appear as a shape of tombstone and each is separated from the next without any coupling element across the top of the frame members so that the animal can reach between each tombstone member and the next tombstone member by placing its head over the top of the tombstones down between the tombstones for reaching into the material for feeding.

Figure 2:
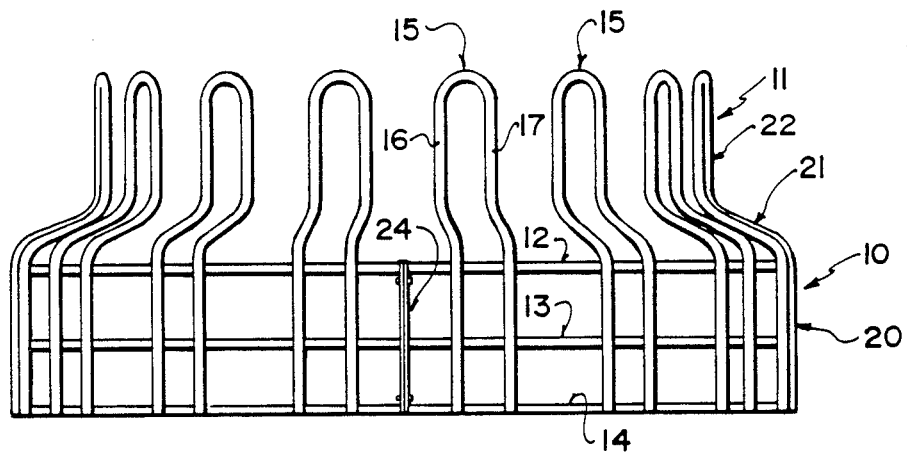
FIG. 2 is a side elevational view of the feeder of FIG. 1.

Each of the tombstone members as shown in FIGS. 1 and 2 includes a portion 20 welded to the outer surface of the outer frame and providing structural strength for the outer frame and also rigidly attaching the tombstone member to the outer frame so that it is resistant to breakage.

A first portion 21 of the tombstone member is inclined inwardly and upwardly toward the bale. A second portion 22 extends vertically upwardly so that all of the second portions 22 lie on a circle having a diameter less than that of the outer frame. The second portions 22 as best shown in FIG. 1 define a circle which is shaped to confine the bale within the area bounded by the second portions so that the bale is held away from the outer frame portion.

As best shown in FIG. 3 there is a modified arrangement in which the upper edge of the second portions 22 includes an outwardly curved portion 22A which defines a feed in surface by which the bale can dropped into the area centrally of the bale and centered into the position confined by the second portions of the tombstone members.

As shown in FIG. 3 the height of the outer frame is of the order of eighteen inches to two feet so that it reaches just to the brisket of the animal that is below the shoulder or just at the top of the leg. The neck of the animal extends over the inclined portion 21 allowing the head to reach between the tombstone members for feeding. When the bale is closely adjacent the tombstone members the animal can reach the feed material without pressing its head fully through the tombstone members. When it is necessary to reach through, when the bale is becoming smaller, the smaller animals can push their head directly between the tombstone members whereas larger animals or horned animals will need to lift their head over the tombstone member and slide it down between two tombstone members.

As best shown in FIG. 1 the spacing between the legs of the tombstone members increases toward the outer frame so that the animal can reach down to a position adjacent its front feet just inside the outer frame and can move its head from side to side in view of the increased spacing between the tombstone members.

In FIGS. 1 and 2 it is shown that the frame is broken into three separate portions which are bolted together as indicated at 24. This can be done for ease of transportation, but in some cases where transportation is not a problem, the feeder can be made as an integral unit. A suitable flange is welded on the ends of the hoops 12, 13 and 14 thus forming a portion which extends over a 120°. When bolted together the hoops form the full 360° defining a circular feeder. However when separated it will be appreciated that each portion can be stacked on top of the next adjacent portion with the outer periphery of one portion engaging the inner periphery of the next adjacent portion and the tombstone members either directly overlying each other or offset so that the tombstone members of one lie intermediate the tombstone members of the next adjacent portion. In this way transportation of the feeders requires very little space.

The device described above has the following advantages.

(1) it is very simple to position the feeder over the bale or to drop the bale into the interior of the feeder. This is because the position on the feeder where the bale is confined includes an inclined feed in portion so that the portion that first engages the bale is of increased diameter leading toward the most confined diameter portion.

(2) The bale always remains centered within the feeder.

(3) The amount of wastage outside the feeder is dramatically reduced since the animal is encouraged to eat with its head inside the outer frame so that any material dropping collects inside the outer frame and can be eaten without being trampled.

(4) The fact that the tombstone members bend away from the animal prevent the animal from pressing its shoulders against the tombstones thus reducing forces tending to break the feeder.

(5) The cattle cannot push the feeder around within the feed lot which can cause further damage or can locate it at places where its not required and can disturb the feed within the feeder.

(6) It provides the advantages of the ring feeder described above including inner and outer frames and yet includes the advantage of the tombstone feeder which has increased rigidity, the improved access by the animal and the reduced danger of the animal having its head trapped.

(7) The product can be easily packaged and shipped thus reducing transportation costs.

(8) The product is equal to or only slightly more expensive than a conventional tombstone feeder accordingly can be sold at reasonable price or a good profit.

(9) The configuration of the tombstone members by which the spacing between the members increases and decreases along the length of the members allows easy manouverability of the animals head.

(10) The number of stations for animal feeding around the feeder is increased by the larger diameter of the frame.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A feeder for receiving a large cylindrical bale for distributing the bale to a number of animals, comprising an outer frame portion shaped to rest upon the ground and to define a band surrounding the bale and having an upper edge at which the outer frame terminates and a plurality of elongate frame members each connected to the outer frame and each having a first portion extending therefrom inwardly toward the bale and a second portion extending from the first portion upwardly to a height above the upper edge of the outer frame portion.

2. The invention according to claim 1 wherein each of the frame members comprises one of a pair of the frame members which pair is connected at upper ends of the frame members to define an inverted U-shaped member with legs of the U-shaped member depending downwardly and forming the frame members.

3. The invention according to claim 2 wherein a path is defined between each of the U-shaped members and the next adjacent U-shaped member which path is open at the top to allow the head of the animal to pass downwardly into the path from above the top of the U-shaped members between the adjacent ones of the frame members.

4. The invention according to claim 1 wherein the height of the upper edge of the outer frame is arranged such that the upper edge is below the shoulder of the animal with the frame members extending upwardly beyond the upper edge in front of the animal with the animal facing inwardly over the outer frame.

5. The invention according to claim 4 wherein the frame members are attached to the upper edge of the outer frame with the first portion thereof extending inwardly therefrom.

6. The invention according to claim 5 wherein each of the frame members includes a portion extending vertically of the outer frame and connected to the outer frame.

7. The invention according to claim 6 wherein the outer frame comprises a plurality of horizontal rails extending circumferentially of the outer frame with the vertical portions of the frame members connecting each horizontal rail to the next adjacent horizontal rail.

8. The invention according to claim 1 wherein the outer frame is circular in plan such that the spacing of the second portion of each frame member from the next adjacent frame member is less than the spacing of the frame member from the next adjacent frame member at the outer frame.

9. The invention according to claim 1 wherein each frame member lies in a vertical plane lying at right angles to the outer frame at the point of connection between the frame member and the outer frame.

10. The invention according to claim 1 wherein the outer frame is formed of a plurality of separate parts divided angularly of a central vertical axis of the outer frame with each part carrying a plurality of the frame members.

11. The invention according to claim 1 wherein each of the frame members includes a third portion inclined outwardly from a top end of the second portion to act as an inclined guide surface for centering the bale as it slides into the area confined by the second portions of the frame members.

12. The invention according to claim 1 wherein the outer frame includes a skirt formed from a sheet material extending from the ground upwardly over at least a part of the outer frame to confine feed material to the interior of the outer frame.

13. A feeder for receiving a large cylindrical bale for distributing the bale to a number of animals, comprising an outer frame portion which is substantially circular in plan and defines a band having a lower surface for resting upon the ground and for surrounding a bale resting upon the ground inwardly of the outer frame portion, the outer frame portion having an upper edge at which the outer frame portion terminates and a plurality of tombstone frame members each comprising an inverted U-shaped member defining a curved upper connecting portion and a pair of depending legs with each of the legs connected to the outer frame so as to extend upwardly from the upper edge of the outer frame to a height above the upper edge, each of the tombstone frame members having a first portion extending inwardly from the upper edge toward the bale and a second portion extending from the first portion substantially vertically upwardly to a height above the upper edge of the outer frame portion, the second portions of the tombstone frame members lying on a circle having a diameter less than the diameter of the outer frame portion so as to confine the bale inwardly of the outer frame portion and to define a space between the circle and the outer frame portion.

14. The invention according to claim 13 wherein a path is defined between each of the tombstone frame members and the next adjacent tombstone frame member which path is open at the top to allow the head of the animal to pass downwardly into the path from above the top of the frame members between the adjacent ones of the frame members.

15. The invention according to claim 13 wherein the height of the upper edge of the outer frame is arranged such that the upper edge is below the shoulder of the animal with the frame members extending upwardly beyond the upper edge in front of the animal with the animal facing inwardly over the outer frame.

16. The invention according to claim 15 wherein the tombstone frame members are attached to the upper edge of the outer frame with the first portion thereof extending inwardly therefrom.

17. The invention according to claim 16 wherein each of the tombstone frame members includes a portion extending vertically of the outer frame and connected to the outer frame.

18. The invention according to claim 17 wherein the outer frame comprises a plurality of horizontal rails extending circumferentially of the outer frame with the vertical portions of the frame members connecting each horizontal rail to the next adjacent horizontal rail.

19. The invention according to claim 13 wherein each of the frame members includes a third portion inclined outwardly from a top end of the second portion to act as an inclined guide surface for centering the bale as it slides into the area confined by the second portions of the tombstone frame members.

20. The invention according to claim 13 wherein the outer frame includes a skirt formed from a sheet material extending from the ground upwardly over at least a part of the outer frame to confine feed material to the interior of the outer frame.

* * * * *